Aug. 14, 1945.     R. E. GREY ET AL     2,382,412
FUEL PUMP
Filed Sept. 3, 1943     2 Sheets-Sheet 1

INVENTORS
RALPH E. GREY
LOUIS G. BURNS
BY
ATTORNEYS

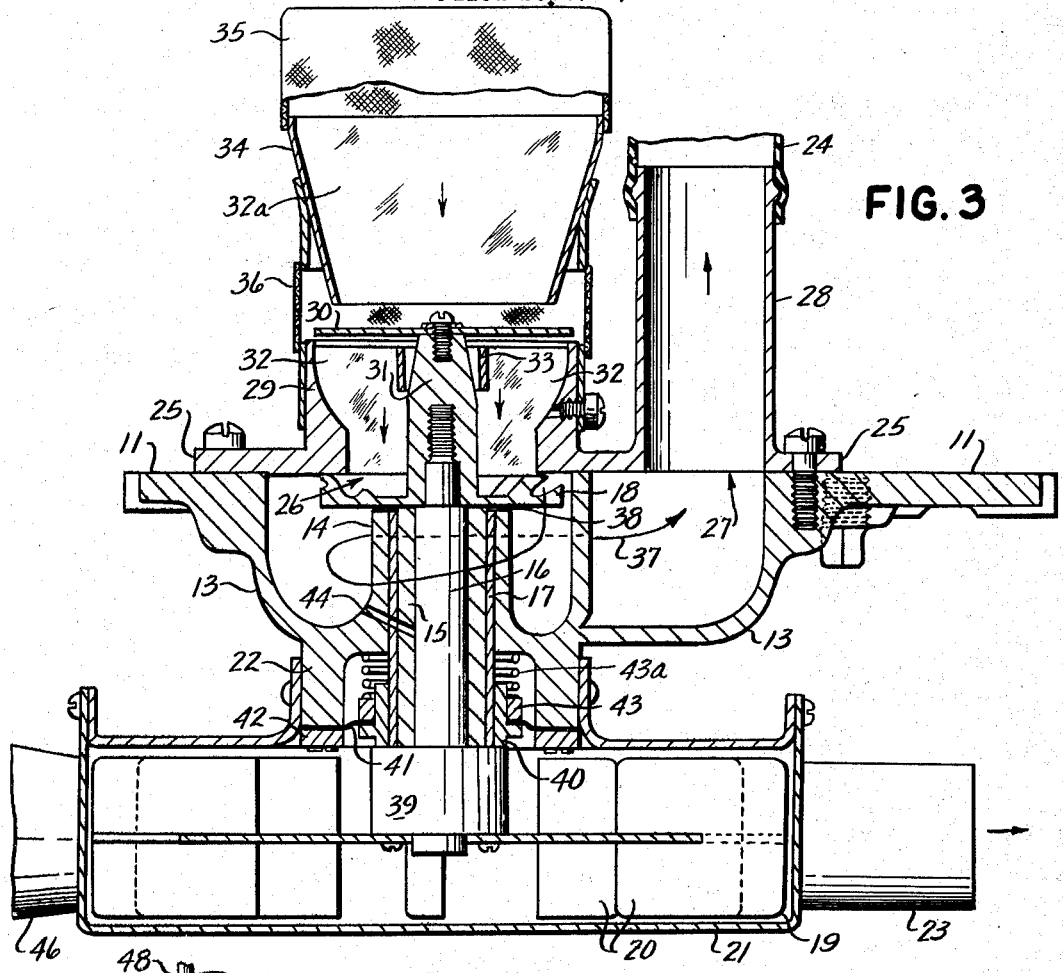
FIG. 3
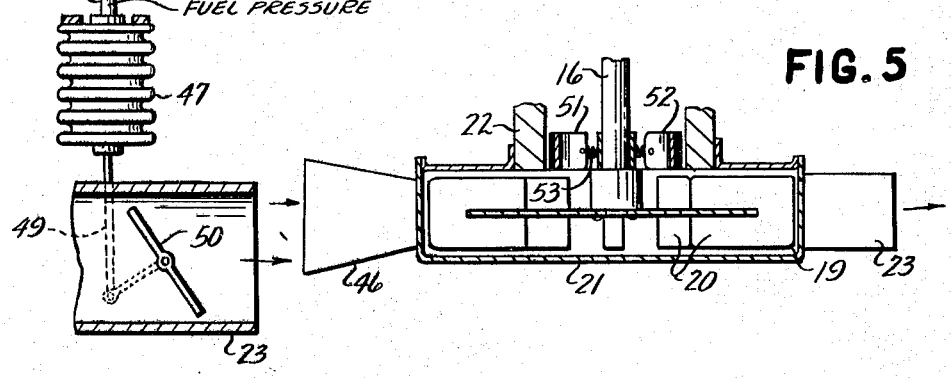
FIG. 5
FIG. 4
INVENTORS
RALPH E. GREY
LOUIS G. BURNS

Patented Aug. 14, 1945

2,382,412

UNITED STATES PATENT OFFICE 2,382,412

FUEL PUMP

Ralph E. Grey, Osborne, and Louis G. Burns, Dayton, Ohio

Application September 3, 1943, Serial No. 501,082

10 Claims. (Cl. 103—97)

(Granted under the act of March 3, 1883, as amended April 30, 1928; 370 O. G. 757)

The invention described herein may be manufactured and used by or for the Government for governmental purposes, without the payment to us of any royalty thereon.

This invention is a safety device for aircraft and more particularly an auxiliary fuel system.

An object of the invention is to provide means for an auxiliary fuel supply which may be dropped in emergency or discarded when the fuel is expended. The invention aims further to provide a dependable fuel pump operable to maintain fuel available for use during flight of the aircraft, upon which it is mounted, regardless of engine failure, upon which fuel pumps are ordinarily dependent, and regardless of failure of electric or other motors frequently employed for the operation of fuel pumps.

Another object of the invention is to provide an auxiliary fuel system operable as a booster for the main system, or independently to supply fuel in the event of failure of the primary system, whereby to assure adequate fuel delivery under normal, as well as abnormal, flying conditions.

Still another object of the invention is to provide a pump operable to maintain fuel available from a reserve or auxiliary tank in the event of emergency, damage to the primary tank, its couplings, pumps, or in the event of depletion of supply of the primary tank.

A still further object of the invention is to provide a fuel system operable by any air flow which is sufficient to maintain an aircraft in flight.

Another object is to provide an auxiliary fuel system which includes means for separating air or gas from gas-liquid fuel mixtures, whereby fully liquid fuel will be made available.

A further object of the present invention is the provision of a fuel system which is operable to deliver fuel under pressure to a point elevated with respect to the auxiliary supply.

Another object is to provide a pump droppable with a releasable tank and independently operable by flight of the craft to which the combination may be secured.

Figure 1:
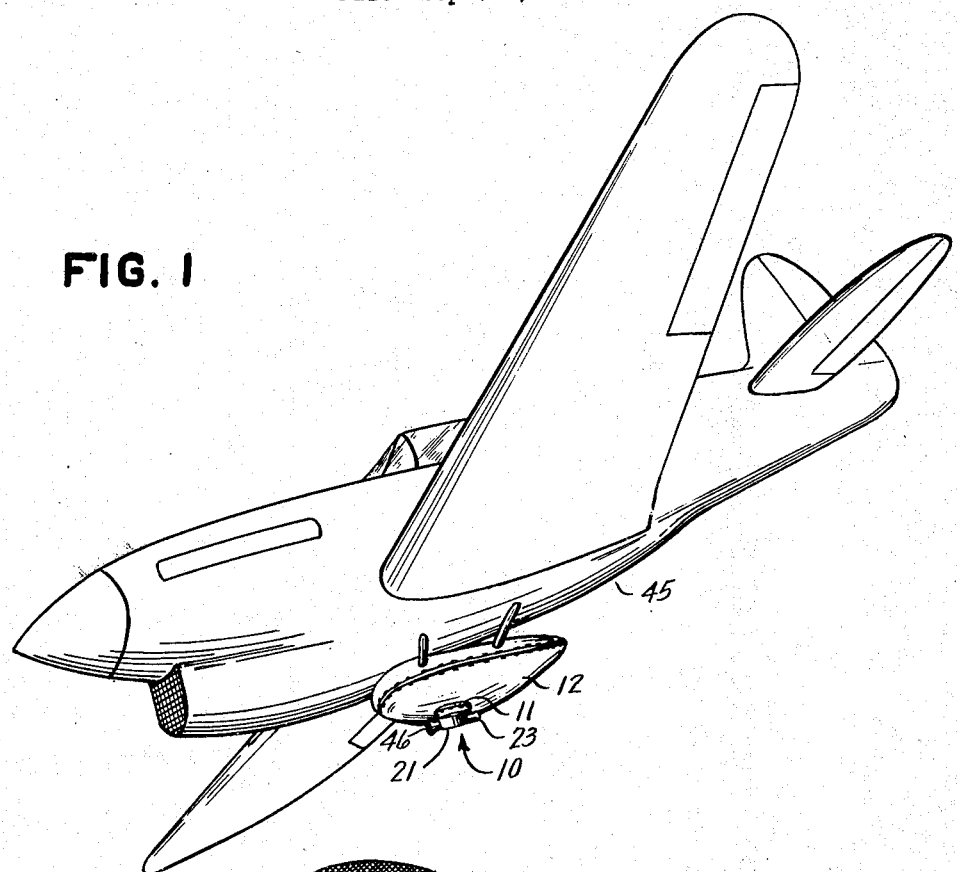
Figure 2:
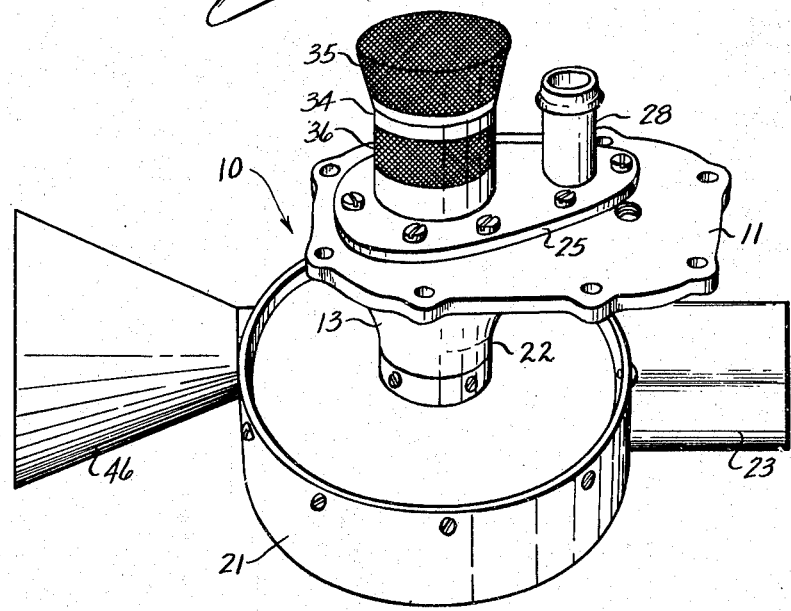

With the foregoing and other objects and aims in view, our invention resides in the combination of parts and in the details of construction hereinafter set forth in the following specification and appended claims, certain embodiments thereof having the characteristics of our invention and by which the same may be practiced, being illustrated in the accompanying drawings in which:

Fig. 1 is illustrative of the application of the improved pump to an auxiliary or droppable fuel tank as borne by an airplane;

Fig. 2, a perspective view of the assembled, but unmounted pump;

Fig. 3, a section in elevation through the pump;

Fig. 4, a sectionalized view of a suitable pressure control means for the pump, and Fig. 5, a sectionalized view of speed control means for the pump.

The improved fuel feeding means 10 is of the type which depend upon the forces of gravity for their supply of liquid to be impelled and is, accordingly, carried by a plate 11 which is secured or adapted to be secured over or to an opening or port in the bottom of an auxiliary tank 12 in a manner whereby the fuel impeller of the assembly is in communication with the interior of the tank. The plate 11 is provided with a centrally disposed bowl 13, or in lieu thereof, the plate may be provided with a centrally disposed opening in communication with a bowl secured to the plate 11. From another viewpoint, the bowl-provided plate may be considered as a bowl-like element 13 having a plate-like brim 11 adapted to be secured over an opening in an auxiliary tank 12.

An upstanding bearing block 14 is disposed centrally within the bowl 13. This block is, in turn, provided with a bearing 15 for a drive shaft 16 extending vertically through the bowl. The bearing may be carried by a sleeve 17, which may be desirable in the utilization of a carbon bearing. A fuel impeller 18 is mounted upon the shaft 16 within the bowl 13 atop the bearing block 14. An air rotor 19 is mounted on the lower end portion of shaft 16 for driving the shaft upon which the fuel impeller is fixed. In order that wind may be effectively directed upon the blades 20 of the wind motor so as to cause rotation thereof, the motor is incased in a drum 21 secured to a pedestal 22 on the bottom of the bowl 13 in a manner whereby the blades of the wind motor are brought into communication with a secantly disposed wind tube 23 carried by the drum and into which tube the blades extend as they are successively rotated, each blade substantially closing the throat of the tube when rotated into a position normal with respect to the axis of the wind tube.

In order that fuel gravitating from the tank may be directed upon the fuel impeller and forced thereby through the bowl 13 into a communicating supply tube 24, a bowl lid 25 is provided. This lid is provided with an opening 26 in alignment with the fuel impeller 18 within the bowl, and is provided with another opening 27 which leads from the bowl 13 into the opening through a collar 28 surrounding the opening 27, to which collar the supply tube 24 may be secured. Opening 26, leading to the fuel impeller, is also provided with a somewhat funnel shaped collar 29 at the mouth of which there is provided a propeller-like agitator 30 secured to the hub 21 of the fuel impeller and rotatable therewith to beatingly separate air or gas from the fuel, should it contain the same or be of a gas-liquid mixture, whereby but fully liquid fuel is forced into the supply tube in order to prevent air or gas entrapment and carburation failures. Baffles 32, fixed upon a collar 33, are mounted within the throat of the funnel-shaped collar 29 radially of the impeller hub 31 in order to prevent a vortex and to cause the fuel to flow to the impeller in a direction normal thereto for efficiency in operation.

Since the collared opening 26 is intended to be in communication with the interior of the tank and since the fuel is intended to gravitate into the opening, a funnel 34 is secured to the collar 29 in order to direct the fuel across the agitator 30, through the baffles 32, to the fuel impeller 18. Additional baffles 32a may be positioned within the funnel 34 to cause the fuel to flow to the agitator normal thereto for the most effective results from the operation of the agitator. The funnel 34 is capped with a filter screen 35 and in the side wall of the funnel, a screened gap 36 is provided on a plane with the agitator 30 as an outlet for the gas and air beaten from the fuel by the agitator.

To facilitate the flow of liquid fuel from the bowl 13 and prevent an entrapment of the impelled fuel, the bowl is preferably of a spiral configuration gradually increasing in cross sectional area, as indicated in Fig. 3 by arrow 37, from a point adjacent one side of the bearing block 14 and continuing therearound to a point in communication with opening 27 leading to the supply tube.

To prevent leakage of fuel from the bowl 13 to the wind motor 19, the fuel impeller 18 caps the end of the bearing post 14, the end of the bearing 15 and the end of the bearing sleeve 17, which ends provide a bearing race 38 for the under bearing surface of the fuel impeller. To further seal the shaft bearing against leakage from the bowl 13 to the wind motor 19, the wind motor is provided with a hub 39 which caps the lower end of bearing 15 and bearing sleeve 17 and extends in diameter beyond that of the sleeve 17 to provide frictional contact with a sealing ring 40 to which is clamped a diaphragm 41 extending from the sealing ring 40 to the walls of the bowl pedestal 22. The diaphragm may be secured to the pedestal by impingement between the end of the pedestal and a securing ring 42 screwed to the end thereof. The inner edge of the diaphragm may be secured to the sealing ring 40 by another securing ring 43, as illustrated in Fig. 3. To maintain good frictional contact between the sealing ring 40 and the hub 39 of the wind motor, a spring 43a is interposed between the base of the bowl 13 and the ring 43 which is borne by sealing ring 40.

A small amount of leakage into the bearings is not objectionable, however, since it is advantageous to have the bearing 15, such as a carbon bearing, lubricated by the liquid fuel and for this purpose the bowl 13, sleeve 17, and bearing 15 may be bored as indicated by reference 44, Fig. 3, for lubrication by fuel directly from the bowl.

In securing the assembly to a base port of an auxiliary tank, the wind tube 23 should be disposed in a direction longitudinally of the fuselage 45 of the plane. It has been found advantageous in practice to provide a wind tube 23 having the configuration of a venturi and so positioning the same that the blades of the wind motor will reach a position normal to the axis of the tube at a point in the throat or restricted area of the venturi where the wind will have its greatest force. Satisfactory performance also results from a wind tube 23 having a flared or funnel-shaped mouth 46 only, as shown in the drawings.

Means for controlling the fuel pressure within the supply tube 24 and/or for controlling the speed of the wind motor 19 may also be provided, if desired. Suitable means for such purposes are illustrated in Figs. 4 and 5, respectively. As shown in Fig. 4, suitable fuel pressure means may comprise a sylphon 47 connected to the fuel supply line 24 by a conduit 48 and to a lever arm 49 for controlling a butterfly valve 50 positioned within the wind tube 23. For controlling the speed of the wind motor irrespective of the fuel pressure, suitable means, as shown in Fig. 5, may comprise a pair of brake shoes 51 and 52 mounted upon the drive shaft 16 and pivotally controlled with respect to one another by a spring 53 for frictional contact with an inner surface of the pedestal 22 when a predetermined centrifugal force is attained.

Having described our invention and illustrated an embodiment by which the same may be practiced, what we claim is:

1. A pump assembly comprising the combination of a wind motor having a series of blades carried by a rotatably mounted hub and adapted to be driven by a current of air, means for directing a current of air against the successively rotated blades of said motor along a path secantly with respect to the rotational path of said blades, a liquid impeller rotatable by said motor, a fuel line through which liquid is impelled, and means for automatically controlling the rotational speed of said motor comprising an expansible chamber communicating with said fuel line and adapted to be expanded proportionally responsive to liquid pressure therein, and a damper means in the air current, expansion of said expansible chamber operating said damper means to govern rotation of said blades.

2. In a fuel pump assembly adapted to be secured to an auxiliary fuel tank, a wind motor having a rotor adapted for rotation about a substantially vertical axis in normal operation, an impeller bowl having a chamber spiraled in a plane parallel with the plane of rotation of said wind motor and terminating peripherally in a fuel outlet, said impeller bowl being secured intermediate the bottom of the fuel tank and the wind motor, and having an upper face secured to the bottom of said fuel tank, an impeller wheel disposed in said impeller bowl adjacent the upper face thereof and disposed substantially at the bottom of said fuel tank, a shaft secured at one end to the rotor of said wind motor, said impeller wheel being secured at the other end of said shaft, and a channel member secured to the upper face of said impeller bowl and having an intake channel aligned with said impeller wheel for directing gravity-fed fuel thereto and an outlet channel aligned with said fuel outlet, said channels being adapted to extend into said fuel tank.

3. In a fuel pump assembly adapted to be secured to the bottom of a fuel tank for gravity feed, a wind motor and a vane wheel therein disposed for normally horizontal rotation in an air current, an impeller bowl adapted to be secured to the bottom of the fuel tank comprising an impeller chamber disposed about a vertical axis, said bowl having a downwardly extending coaxial collar supporting said wind motor, and a second coaxial collar having an upper extremity in proximity to the bottom of said fuel tank, an impeller wheel in said impeller chamber vertically supported on the upper extremity of said second collar adjacent the bottom of said fuel tank and a shaft journalled in said second collar and axially secured between said vane wheel and said impeller wheel for rotation thereof.

4. In a device as set forth in claim 3, and governing means disposed externally of said wind motor and coacting with said vane wheel for retarding the speed of rotation thereof.

5. In a device as set forth in claim 3, a bore through a wall of said impeller bowl and extending substantially radially through said second collar for providing access of liquid fuel from said bowl to said shaft for lubrication thereof.

6. In a device as set forth in claim 3, a coaxial member surrounding said shaft adjacent said vane wheel, a sealing diaphragm peripherally secured at the extremity of said first collar and having a coaxial circular opening through which said shaft extends, the edges of said opening being supported by said coaxial member and adapted for sealing engagement therewith.

7. In a device as set forth in claim 3, a spring in said first collar compressively stressed against said vane wheel whereby said impeller wheel, said shaft and said vane wheel are held axially positioned relative said impeller bowl.

8. In a device as set forth in claim 3, a coaxial member sealingly surrounding said shaft, a flexible diaphragm sealingly secured between said first collar and said coaxial member, and a spring within said first collar compressively stressed in abutment with said coaxial member whereby said vane wheel, said diaphragm, said shaft and said impeller wheel are held axially positioned relative said impeller bowl.

9. In a device as set forth in claim 3, and means for governing said vane wheel comprising a brake shoe hinged to said shaft and adapted to rotate therewith, said brake shoe being operative by centrifugal force to engage the internal surface of said downwardly extending coaxial collar whereby frictional resistance produces a retarding effect on the rate of rotation of said vane wheel.

10. In a fuel pump assembly adapted to be secured in an opening at the bottom of a fuel tank for gravity feed, an impeller bowl having an impeller chamber therein and a shaft passing therethrough, an impeller wheel, a wind motor secured to said bowl and having a vane wheel disposed for rotation in an air current, said impeller wheel and said vane wheel being secured at opposite ends of said shaft whereby said impeller wheel is disposed adjacent the opening in the bottom of the tank and adapted for rotation by said vane wheel, said impeller bowl having a face provided with intake and outlet openings substantially coplanar with the bottom of the tank, and a channel member adapted to be secured to said face and having intake and outlet channels adapted to extend into the tank and coacting, respectively, with the intake and outlet openings in the face of said impeller bowl.

RALPH E. GREY.
LOUIS G. BURNS.